(12) United States Patent
Stolle

(10) Patent No.: US 8,279,951 B2
(45) Date of Patent: Oct. 2, 2012

(54) METHOD AND DEVICE FOR PRODUCING A TRANSMISSION SIGNAL TO BE TRANSFERRED OVER A TRANSMISSION PATH

(75) Inventor: Reinhard Stolle, Neufahrn (DE)

(73) Assignee: Lantiq Deutschland GmbH, Neubiberg (DE)

( * ) Notice: Subject to any disclaimer, the term of this patent is extended or adjusted under 35 U.S.C. 154(b) by 1574 days.

(21) Appl. No.: 11/343,751

(22) Filed: Jan. 31, 2006

(65) Prior Publication Data

US 2006/0193389 A1 Aug. 31, 2006

(30) Foreign Application Priority Data

Jan. 31, 2005 (DE) .......................... 10 2005 004 370

(51) Int. Cl.
*H04B 3/00* (2006.01)
*H04L 27/00* (2006.01)

(52) U.S. Cl. ........ 375/258; 375/288; 375/257; 375/222; 375/227

(58) Field of Classification Search .................. 375/256, 375/257, 219, 222; 455/116, 126, 314
See application file for complete search history.

(56) References Cited

U.S. PATENT DOCUMENTS

| | | | | |
|---|---|---|---|---|
| 6,049,707 | A * | 4/2000 | Buer et al. | 455/314 |
| 6,718,180 | B1 * | 4/2004 | Lundh et al. | 455/522 |
| 6,724,219 | B1 * | 4/2004 | Kim et al. | 326/30 |
| 6,735,419 | B2 * | 5/2004 | Mitzlaff | 455/127.1 |
| 7,339,997 | B2 * | 3/2008 | Blaha | 375/257 |
| 2003/0031269 | A1 | 2/2003 | Verbin | |
| 2005/0008094 | A1 * | 1/2005 | Kramer et al. | 375/296 |

* cited by examiner

*Primary Examiner* — David Ometz
*Assistant Examiner* — Qutbuddin Ghulamali
(74) *Attorney, Agent, or Firm* — Eschweiler & Associates, LLC

(57) ABSTRACT

A method and device are provided for producing a transmission signal to be transferred over a transmission path from an input signal, for example an xDSL signal, wherein a bandwidth of the input signal is distributed onto a plurality of frequency bands in such a way that part signals are obtained corresponding to the individual frequency bands, and wherein each part signal is conducted to separate line drivers, and wherein output signals of the individual line drivers are combined to form the transmission signal to be transferred over the transmission path by combination means, which can be designed as an adder. In order to obtain the frequency band which pertains in each case from the input signal, which can be transformed into an analogue signal with a D/A converter, filter means can be used.

23 Claims, 3 Drawing Sheets

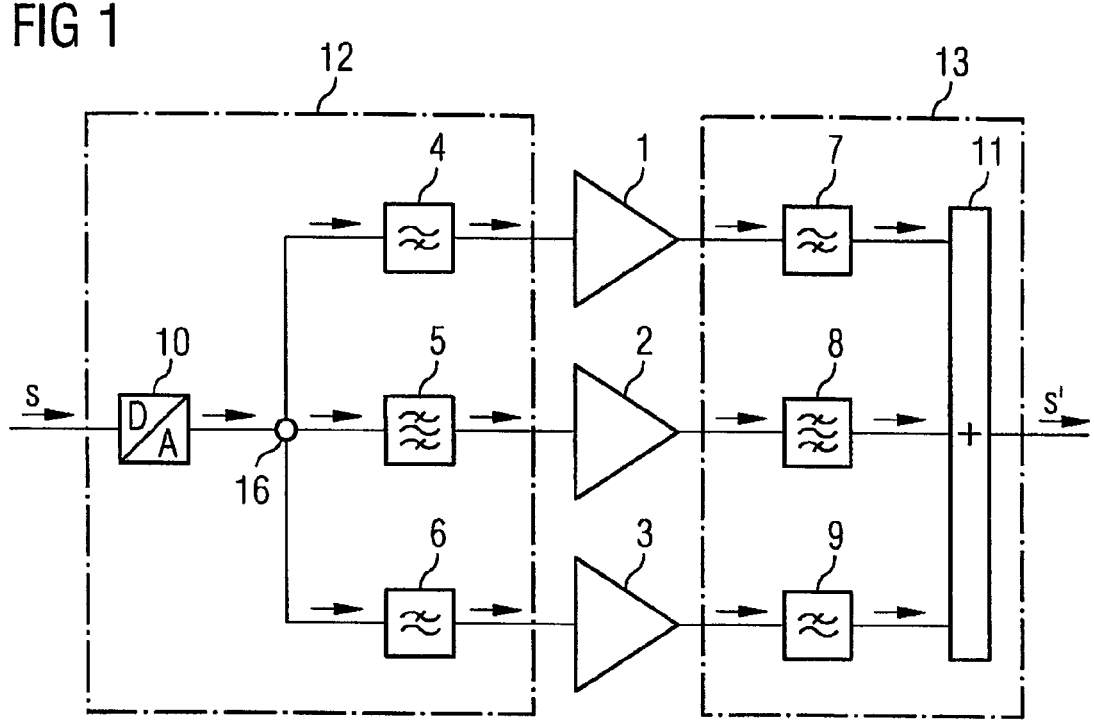
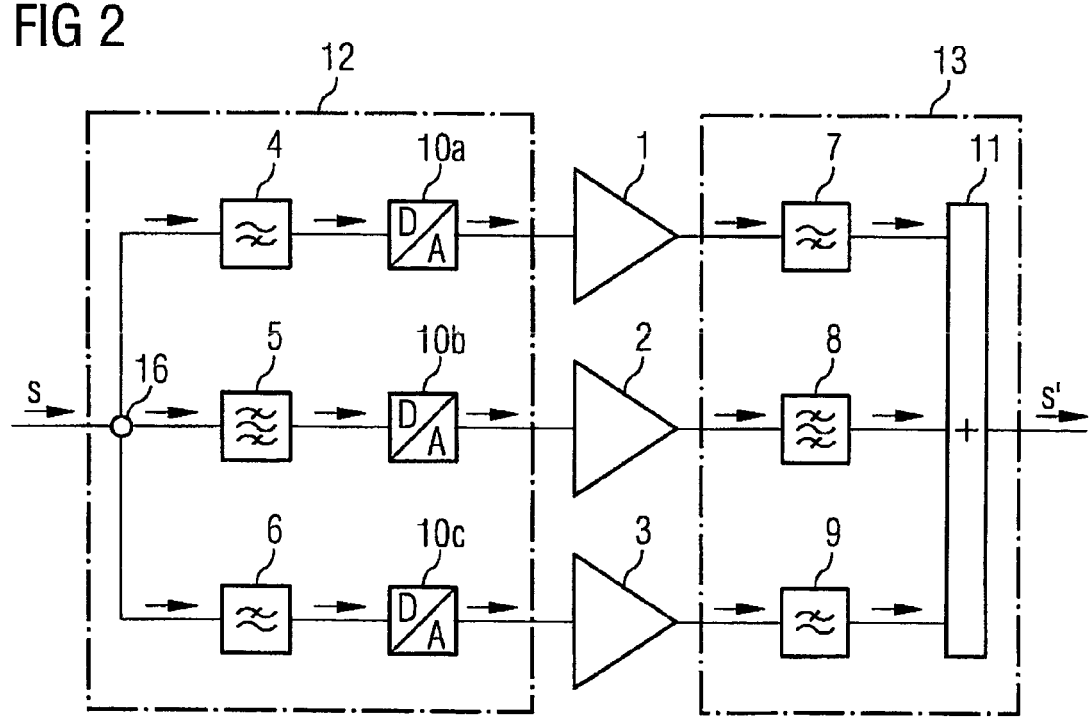

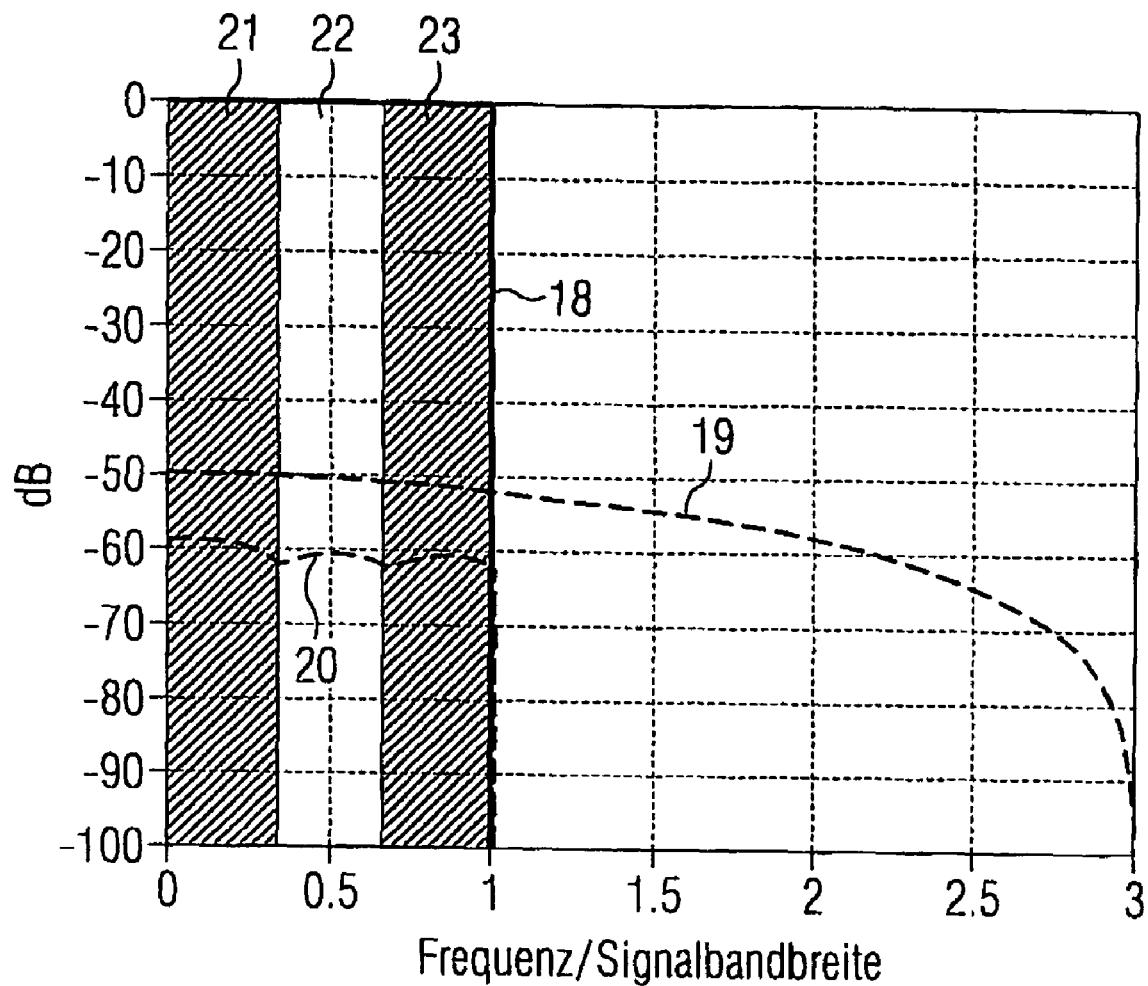

METHOD AND DEVICE FOR PRODUCING A TRANSMISSION SIGNAL TO BE TRANSFERRED OVER A TRANSMISSION PATH

FIELD OF THE INVENTION

The present invention relates to a method and device for producing a transmission signal to be transferred over a transmission path, which in this case is processed by means of line drivers. In particular, the invention relates to a device and a method of this kind for producing an xDSL transmission signal ("Digital Subscriber Line").

BACKGROUND

The development of the DSL technique is oriented towards a constantly rising signal bandwidth. With the VDSL2 ("Very high-speed DSL") standardisation process, a maximum transmission bandwidth of 30 MHz is provided. The development of analogue front ends for such bandwidths is in general a considerable challenge, because the performance demands for VDSL2 are based on the same model for line noise of −140 dBm/Hz, as is used for narrower bandwidths such as ADSL (1.1 MHz, ADSL2+ (2.2 MHz), SHDSL (600 kHz) ("Symmetric High-bitrate DSL") or VDSLI (12 MHz). In this situation, there is particular emphasis on line drivers which are also used in communications technology, among other things, in xDSL transceivers, for example, and in that context are used in particular in the analogue front end.

With the line driver development for a broadband application, such as for VDSL2, the two aims, improving linearity and what is referred to as PAR ("Peak-to-Average Ratio") or what is referred to as the CF factor ("Crest Factor"), play a substantial part. The non-linear switching theory shows that for a non-linear component and with the same power spectral density (PSD), the signal-to-noise ratio (SNR) decreases as the signal bandwidth rises due to non-linear distortion. This means that a large bandwidth and good linearity represent a conflict of aims. A similar problem arises with the PAR property of a line driver. The statistical distribution of the input signal of a line driver for DMT ("Discrete Multi Tone") modulated signals, such as pertain with ADSL and VDSL2, satisfies a Gauss distribution, as a result of which the PAR for a given probability section is constant. If the bandwidth is enlarged, the average power also increases, and so leads to a higher signal peak level.

From the prior art there exist a number of different arrangements, described hereinafter, which for reasons of economy and power consumption have been based hitherto on the use of one line driver per DSL channel in order to reduce the signal peak level.

A first arrangement consists of a feed voltage being increased, which with constant transmission power at the line driver incurs a lower output current and in consequence leads to a lower distortion. The increased feed voltage, however, results in the undesirable disadvantage of an increased PAR.

A second arrangement consists of exploiting the very large amplification bandwidth product of the CMOS technology for the line driver. A more powerful gain feedback in this case improves the linearity behaviour during amplification.

In addition to this, other known arrangements are based on the use of analogue filters controlled directly from the line drivers, in particular bandpass filters, of a higher order, in order to reduce out-band distortion. Despite substantially improved performance features, however, there are a series of substantial disadvantages. For example, for VDSL2 with at least three frequency bands both upstream and downstream, with the line driver development this would require a filter of the order of twenty. In addition to this, filters of a higher order have a not insubstantial pass attenuation and disadvantageous inductivity and capacitance tolerances, which leads to a deterioration of the performance features. Filters of a higher order also cause a greater inter-symbol interference. In this situation, higher costs are also incurred due to the BOM ("Bill Of Material"). In general, analogue filters are characterised by lesser flexibility, because by contrast with digital filters they are only programmable to a very restricted degree. This is very disadvantageous in particular in connection with VDSL2, since in this case a large number of different frequency band plans must be supported. In addition, the analogue filter must cover the entire voltage range of the line driver, which imposes very high demands on the linearity behaviour. In this situation, the linearity of the inductivities used is comparable with the linearity of the line transmitter used for coupling the transceiver in each case to the transmission line.

From the prior art various different algorithms are known for the reduction of the PAR, also designated as PAR reduction algorithms (PARR), which are usually associated with the following disadvantages. For example, by a reduction of the PAR only a smaller signal bandwidth can be obtained, which is at the expense of correction signals. In addition, the development of PARRs is restricted due to the interference radiation based on the correction signals or the restricted power spectrum density (PSD) respectively. A further disadvantage to be pointed out is an increased complexity of digital sub-systems, due largely to a large number of data memories. Some algorithms also cause substantial signal fluctuations at the remote ends, which can lead to undesirable interference elements at remote receivers.

SUMMARY

An object of embodiments of the present invention is therefore to provide a method and a device for producing a transmission signal to be transferred over a transmission path, wherein, in particular for broadband transmission signals, such as a VDSL2 signal, a relatively linear amplification behaviour and little or no rise in PAR are to be attained.

At least some embodiments of the invention provides a method and a device for producing a transmission signal to be transferred over a transmission path. According to these embodiments, in this situation a bandwidth of an input signal is distributed by division means on several frequency bands in such a way that part signals allocated to the individual frequency bands are obtained, and each part signal is conducted to separate line drivers, which in each case are arranged in a corresponding line driver path and in each case are allocated to one or more frequency bands in such a way that in each case one of the part signals is conducted to one of the several line drivers, and output signals of the individual line drivers are in this case combined by combination means to form the transmission signal which is to be transferred over the transmission path. As a result of this, the advantage is derived for circuits with at least two line driver paths that each line driver is only required to drive a part of the total signal flow, but the entire signal voltage oscillation width and signal bandwidth is available to each of them. Due to the fact that, because of the division means, only a part of the whole frequency band of the input signal is to be processed by the line drivers in the individual line driver paths, this leads to a better linear amplification behaviour with a simultaneous absence of rise in the PAR, because the signal peak level for each individual line driver can be reduced.

According to a preferred embodiment, the bandwidth of the input signal is filtered by the filter means allocated to the individual frequency bands, in order to obtain the corresponding part signals, and the output signals from the individual line drivers are filtered once again, before being combined by the combination means to form the transmission signal, by the further filter means allocated to the corresponding part signals and frequency bands. Inasmuch as the number of frequency bands divided onto the frequency band of the input signal is as desired, and the width of the individual frequency bands can be as desired, and therefore as long as the total width of the frequency band of the input signal is covered, the line drivers in the individual line driver paths can be optimised to the restricted frequency band in each case, to a restricted voltage oscillation level, and to a restricted output power. In order to make possible a smooth frequency transition between the line drivers on the lowest filter arrangement, the amount of the sum of the products from the transfer function of the filter means and the transfer function of the further filter means of the same line driver path must give a constant value over all the line driver paths, e.g. the value 1.

In a further embodiment, a D/A conversion is carried out upstream of the filters by means of a D/A converter means. Accordingly, digital transmission signals can also be processed with the invention. As an alternative, the D/A conversion means can also be arranged downstream of the filter means.

In another embodiment, the input signal is an xDSL signal, wherein, for example, the VDSL2 bandwidth of 30 MHz is distributed, for instance, on three frequency bands, in such a way that the lowest band range reaches up to 2.2 MHz, for which already established line drivers from the ADS environment can be re-used, the middle frequency range reached from 2.2 MHz to 17 MHz, and the highest from 17 MHz-30 MHz. This unequal frequency band distribution is advantageous, since a perceptibly higher power spectral density is usually present in the range from 1-2 MHz than in the higher frequency ranges, but in return the line driver must process a comparatively narrow frequency band. Because there are large gaps between the individual transmission bands with VDSL, the selectivity requirements on the filter means and other filter means can be reduced. An estimate of the effects on the linearity behaviour indicates a reduction in the power spectral density of the fault signal as a whole by 10 dB, on the assumption of a flat power spectral density of the signal. Under the same circumstances, the line drivers would have to process voltage peaks reduced by a factor of 4.8 dB.

In another embodiment, the filter means can be realised by transmission means with correspondingly arranged capacitances, which together with the scatter inductivities of the transmission means achieve the desired filter function performance. Since with present arrangements in VDSL2 relative bandwidths of 10000 arise, efficient broadband line transmitters are required.

Although the invention is preferably applicable to xDSL signals, and in this case in particular to VDSL2 signals, the invention may in principle be applied to any kind of signals which are propagated with the aid of a line driver circuit for transmission via a wireless or hardwired transmission link.

The present invention is described hereinafter in greater detail with reference to the appended drawings on the basis of a preferred embodiment.

BRIEF DESCRIPTION OF THE DRAWINGS

FIG. 1 A block circuit diagram of a first embodiment of the present invention for producing a transmission signal to be sent via a transmission link, FIG. 2 An alternative variant of FIG. 1, in which a D/A conversion takes place downstream of the filtering of an input signal, FIG. 3 A possible realisation of a line driver path, such as can be used in FIG. 1 or FIG. 2, FIG. 4 A possible realisation of the embodiment from FIG. 1 or FIG. 2 with two line driver paths, each possessing an independent transformer means for the further filter means, FIG. 5 A possible realisation of the embodiment from FIG. 1 or FIG. 2 with three line driver paths, each possessing an independent transformer means for the further filter means, and FIG. 6 Curves with a total power spectral density of a transmission signal and distortion interference level, on the one hand with one line driver path and on the other with three line driver paths.

DETAILED DESCRIPTION

Figure 3:
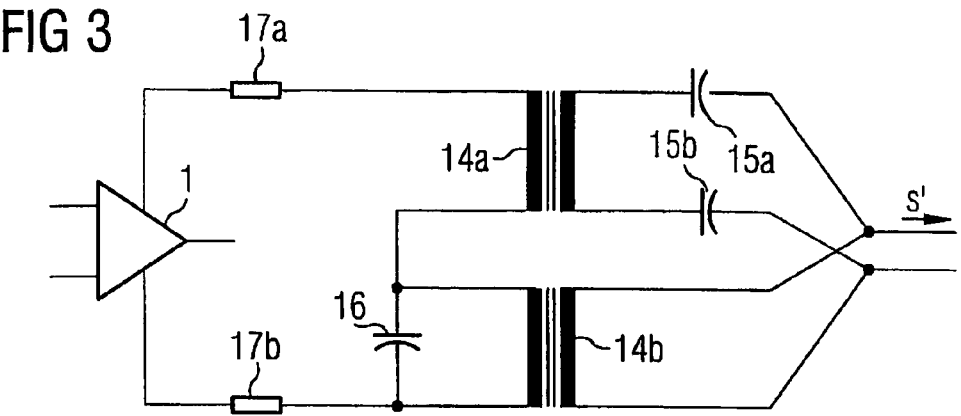

Hereinafter a number of embodiments of the present invention are described in greater detail on the basis of the drawings.

In FIG. 1 an embodiment is shown with three line driver paths, in which in each case a line driver 1-3 is arranged. An xDSL input signal s is transformed in a D/A converter 10 into an analogue signal, which is branched at a node 16 onto the three line driver paths. A filter means 4 is designed as a high-pass, as a result of which the line driver 1 only receives the high-frequency signal parts of the input signal s, amplifies these, and conducts them onwards on the output side into a further filter means 7, which is designed as a further high-pass. A filter means 5 is designed as a band pass, as a result of which the line driver 2 only receives signal parts of the input signal s from a frequency band delimited upwards and downwards, amplifies these, and conducts them onwards on the output side into a further filter means 8, which is designed as a bandpass. A filter means 6 is designed as a low pass, as a result of which the line driver 3 only receives low-frequency signal parts of the input signal s, amplifies these, and conducts them onwards on the output side into a further filter means 9, which is designed as a low pass. The filtered signals from the further filter means 7-9 are combined in a combination means 11, which can be designed as an adder, to form an output signal s'. Accordingly, driver modules specialised to the individual frequency bands can be used as line drivers 1-3. By resourceful distribution of the frequency bands, it is possible, for example, with a VDSL input signal s for an established line driver module from ADSL technology to be re-used in the low-band line driver path for the line driver 3, if this path is dimensioned to the frequency band 0 Hz to 2.2 MHz. The passband ranges of the filter means and of the corresponding further filter means should be approximately the same within each line driver path, and the transmission functions should accord with one another.

The functional performances of the D/A converter 10 and of the filter means 4-6 can be combined in one unit 12 with a multiplexer function and the functional performances of the combination means 11 as well as of the further filter means 7-9 in one unit 13 with a demultiplexer function.

In FIG. 2 an alternative variant to the embodiment in FIG. 1 of the present invention is described. In this case, the xDSL input signal s is divided onto the three line driver paths in a node 16. With the filter means 4 designed as a high pass, the high-frequency signal parts of the input signal s are filtered out, which signal parts are then conducted to a D/A converter 10*a* for conversion into an analogue signal. With the filter means 5 designed as a bandpass, signal parts of the input signal s are filtered out of a frequency band delimited upwards and downwards, which signal parts are then conducted to a D/A converted 10*b* for conversion into an analogue signal. With the filter means 6 designed as a low pass, the low-frequency signal parts of the input signal s are filtered out, which signal parts are then conducted to a D/A converter 10*c* for conversion into an analogue signal. The individual analogue signals in the individual line driver paths are conducted to the corresponding line drivers 1-3 contained therein, for amplification. Exactly as represented and described in FIG. 1, the individual amplified signals are filtered on the output side of the line drivers in each case with the further filter means 7-9, wherein the reference number 7 designates a high pass, the number 8 a bandpass, and the number 9 a low pass, and then combined in the combination means 11, which can be designed as an adder, to form an output signal s'. The advantage of this embodiment is that the filter means 4-6 can be designed as digital filters, since the D/A conversion is not carried out until after the filtering. Due to the use of digital filters, a clear reduction in costs can additionally be achieved in comparison with the use of analogue filters, as in FIG. 1. In addition, this also makes it possible for a flatter frequency transfer to be achieved between the line drivers on the lowest filter arrangement, since during manufacture the situation can be achieved that the amount of the sum over the products from the transmission function of the filter means and of the transmission function of the further filter means of the same line driver path over all line driver paths exhibits a minor deviation to a non-frequency-dependent constant.

In FIG. 3 a possible realisation of a line driver path is represented, the further filter means being realised essentially by transmission means 14*a* and 14*b*. The output of the line driver 1 is connected by two transmissions means 14*a*, 14*b*, connected in series wherein in each case between the line driver 1 and the two transmission means 14*a*, 14*b*, on the primary side are connected Ohmic resistors 17*a*, 17*b*, in series, preferably having the same value (with a symmetrical circuit layout) as terminating resistors. Connected in parallel to the transmission means 14*b* is a capacitor 16. The two transmission means 14*a*, 14*b* are connected on the secondary side in parallel to a common output for the output signal s'. Connected in series upstream and downstream of the transmission means 14*a* on the secondary side in each case are capacitors 15*a*, 15*b*, having the same value. The transmission means 14*a* forms, together with the capacitors 15*a*, 15*b* a high-pass filter means. The transmission means 14*b* forms, together with the capacitor 16, a low-pass filter means. Without the capacitors 15*a* and 15*b* arranged on the secondary side at the transmission means 14*a*, the transmission means 14*b* would be bound in its operating frequencies. Likewise, the transmission means 14*a* would be in the idle state in its operating frequencies if the capacitor 16 were not present on the primary side at the transmission means 14*b*. These twin transformers, as they are referred to, are usable, because they can be manufactured with the same tolerance for the scatter inductivity and the main inductivity. Because with the present arrangements in VDSL2 relative bandwidths of 10000 occur, efficient broadband line transmitters of this kind are required, such as a principle model of the type represented in this embodiment.

Figure 4:
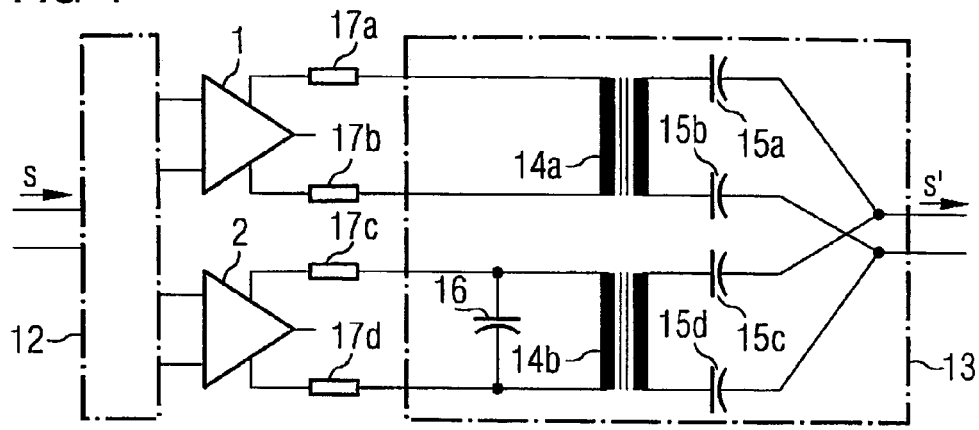

In FIG. 4 an extension of the embodiment from FIG. 3 is represented with two line driver paths, wherein each path is provided with its own transmission means 14*a* and 14*b* respectively. After the multiplexing 12 of the xDSL input signal s, a part signal is conducted to the line driver 1 of the first line driver path, and a second part signal to the line driver 2 of the second line driver path. The first line driver 1 is short-circuited by the transmission means 14*a* connected in series, wherein, between the transmission means and the line driver 1 in each case the Ohmic resistors 17*a*, 17*b* of the same value are connected upstream and downstream as terminating resistors. Correspondingly, the second line driver 2 is short-circuited by the transmission means 14*b* connected in series, wherein Ohmic resistors 17*c*, 17*d*, preferably having the same value, are connected upstream and downstream as terminating resistors between the transmission means 14*b* and the line driver 2 and a capacitor 16 is connected in parallel to the transmission means 14*b* on the primary side. The two transmission means 14*a* and 14*b* respectively of the two line driver paths are connected in parallel on the secondary side to the common output for the output signal s'. In this situation, in each case capacitors 15*a*-15*d* are connected in series upstream and downstream of the transmission means 14*a* and 14*b* respectively. The transmission means 14*a* forms, together with the capacitors 15*a*, 15*b* the further filter means, which is designed as a high pass, and the transmission means 14*b* together with the capacitor 16 forms the further filter means, which is designed as a low pass. With the appropriate selection of the values of the individual components, the capacitors 15*c*, 15*d* can be done away with, provided that no splitter is used. The capacitor 16 can also be done away with if the inputs of the transmission means are uncoupled, although as a result it is difficult to keep the overall output impedance of the transmission means parallel circuit 14*a*, 14*b* constant.

Figure 5:
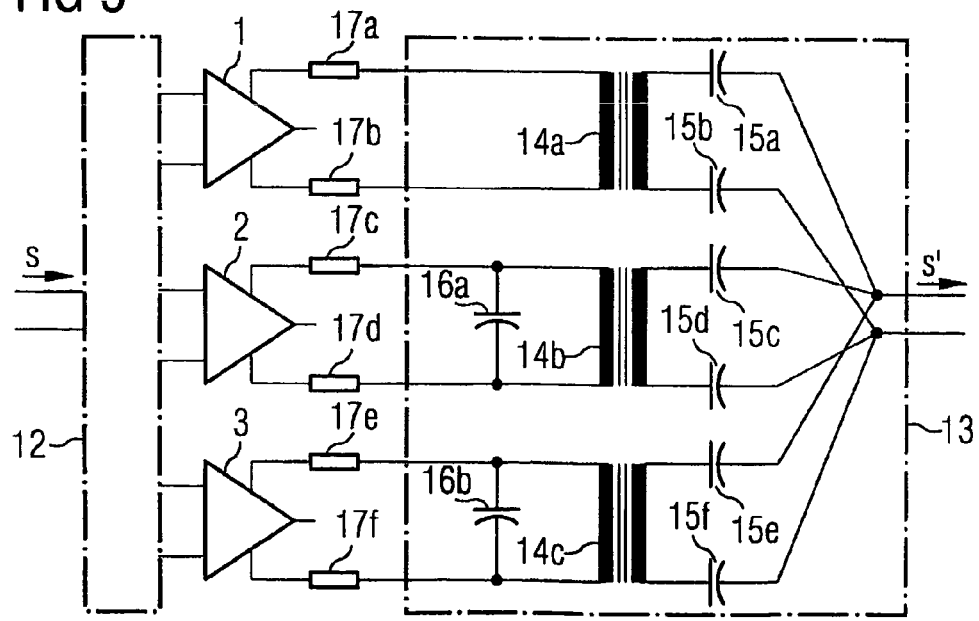

FIG. 5 shows an extension of the realisation of the embodiment from FIG. 4 with three line driver paths, each path being provided with its own transmission means 14*a*, 14*b*, and 14*c* respectively. After the multiplexing 12 of the xDSL input signal s a first part signal is conducted to the line driver 1 of the first line driver path, a second part signal is conducted to the line driver 2 of the second line driver path, and a third part signal to the line driver 3 of the third line driver path. The first line driver 1 is connected via the transmission means 14*a* connected in series, wherein the Ohmic resistors 17*a*, 17*b* of equal value are connected in each case upstream and downstream between the transmission means and the line driver 1, as terminating resistors.

Correspondingly, the second line driver 2 is short-circuited by the transmission means 14*b* connected in series, wherein Ohmic resistors 17*c*, 17*d*, of equal value, are connected upstream and downstream as terminating resistors between the transmission means 14*b* and the line driver 2, and a capacitor 16*a* is connected in parallel to the transmission means 14*b* on the primary side. The third line driver 3 is also connected via the transmission means 14*c* connected in series, wherein in each case Ohmic resistors 17*e*, 17*f* of equal value are connected as terminating resistors upstream and downstream between the transmission means 14*c* and the line driver 3, and a capacitor 16*b* is connected in parallel to the transmission means 14*c* on the primary side. The three transmission means 14*a*, 14*b* and 14*c* of the three line driver paths are connected on the secondary side in parallel to the same output for the output signal s'. In this situation, in each case capacitors 15*a*-15*f* are connected in series on the secondary side upstream and downstream of the transmission means 14*a*, 14*b* and 14*c* respectively. The transmission means 14*a* together with the capacitors 15*a*, 15*b* forms the further filter means, which is designed as a high pass, the transmission means 14b together with the capacitors 16a and 15c, 15d forms the further filter means, which is designed as a band pass, and the transmission means 14c together with the capacitor 16b forms the further filter means, which is designed as a low pass. With the appropriate selection of the values of the individual components, by analogy with the explanations for FIG. 4, the capacitors 15e-15f and the capacitors 16a, 16b can be done away with.

In FIG. 6, to illustrate the improved linearity behaviour of a method and device with three line driver paths connected in parallel according to the present invention, a curve of a total power spectral density 18 of a transmission signal is shown, as well as curves of distortion interference levels 19 and 20. If a line driver is subjected to a total bandwidth to be transmitted, this leads to a substantial out-band distortion interference level, as characterised by the curve 19. With the use according to the invention of three line driver paths (see, for example, FIG. 1), which in each case amplify the signal parts of a frequency band 21-23, no out-band distortion interference levels arise. In addition, this also reduces the in-band distortion interference level by 10 dB. There are two reasons for this behaviour. On the one hand, each line driver path receives only a part of the total power, as a result of which the non-linear characteristic is less marked. On the other, the frequency band distribution in each individual filter reduces the out-band distortion, so that (on the assumption of ideal admission and blocking ranges) no out-band distortions at all are present any longer at the line driver outputs.

The invention claimed is:

1. A method for producing a transmission signal to be transferred over a transmission path, comprising:
   a) distributing a bandwidth of an input signal onto a plurality of frequency bands such that part signals occupy corresponding ones of the plurality of frequency bands;
   b) providing each part signal to a separate line driver, each of the separate line drivers arranged in a corresponding separate line driver path of a plurality of line driver paths and each line driver path having a transfer function associated therewith; and
   c) combining output signals from each of the separate line drivers to form the transmission signal to be transmitted over the transmission path;
   wherein the step of combining combines the output signals from each of the separate line drivers such that a sum of the transfer functions of the plurality of line driver paths corresponds to an essentially non-frequency-dependent constant value.

2. The method according to claim 1, wherein step a) further comprises distributing the bandwidth of the input signal by filtering the input signal.

3. The method according to claim 2, wherein step c) further comprises filtering the output signals from the separate line drivers before combining to the transmission signal using filters having pass bands corresponding to corresponding ones of the plurality of frequency bands.

4. The method according to claim 2, wherein step a) further comprises performing digital-to-analog conversion on the input signal before the filtering of the input signal.

5. The method according to claim 2, wherein step a) further comprises performing digital-to-analog conversion on the part signals.

6. The method according to claim 1, wherein the bandwidth of the input signal is composed of the individual frequency bands.

7. The method according to claim 1, wherein the bandwidth of the input signal is distributed essentially uniformly onto the individual frequency bands.

8. The method according to claim 1, wherein step c) further comprises combining the output signals by addition to form the transmission signal to be transferred over the transmission path.

9. The method according to claim 1, wherein the transmission signal is an xDSL signal.

10. The method according to claim 9, wherein the transmission signal is a VDSL2 signal.

11. The method according to claim 1, wherein the transmission signal is a VDSL2 signal, and a lowest of the plurality of frequency bands corresponds to a bandwidth of ADSL.

12. A device for producing a transmission signal to be transferred over a transmission path, comprising:
   distribution means for the distribution of a bandwidth of an input signal onto a plurality of frequency bands, in order to obtain part signals corresponding to one of the plurality of frequency bands;
   a plurality of line drivers, wherein each line driver of the plurality of line drivers is arranged in a corresponding line driver path, thereby resulting in a plurality of line driver paths, and wherein each line driver path of the plurality of line driver paths is allocated to one or more frequency bands such that each part signal is fed to a corresponding one of the plurality of line drivers, and wherein each of the plurality of line driver paths have a transmission transfer function associated therewith, and wherein a sum of the transmission transfer functions of the plurality of line driver paths corresponds to an essentially non-frequency-dependent constant value;
   combination means for combining output signals from the plurality of line drivers to form the transmission signal to be transmitted over the transmission path.

13. The device according to claim 12, wherein the distribution means comprises filter means for the distribution of the bandwidth of the input signal into the plurality of frequency bands.

14. The device according to claim 13, further comprising further filter means allocated to the corresponding part signals and frequency bands, which filter the output signals of the plurality of line drivers before combining to the transmission signal.

15. The device according to claim 14, further comprising a D/A converter arranged upstream of the filter means.

16. The device according to claim 14, further comprising a D/A converter arranged downstream of the filter means.

17. The device according to claim 14, wherein the filter means comprises transmission means which are connected in such a way that a filter function is obtained which is allocated to the individual frequency band.

18. The device according to claim 17, wherein the filter means includes capacitors connected to the transmission means.

19. The device according to claim 12, wherein the combination means comprises an adder that is configured to add the output signals of the plurality of line drivers to form the transmission signal.

20. The device according to claim 12, wherein the device is designed for producing the transmission signal as an xDSL signal.

21. The device according to claim 20, wherein the device is designed for producing the transmission signal as a VDSL2 signal.

22. A device for producing a transmission signal to be transferred over a transmission path, comprising:
   a distribution circuit configured to distribute a bandwidth of an input signal onto a plurality of frequency bands, in order to obtain part signals, wherein each part signal corresponds to one of the plurality of frequency bands;

a plurality of line drivers, wherein each line driver is arranged in a corresponding line driver path, thereby resulting in a plurality of line driver paths, and wherein each line driver path of the plurality of line driver paths is allocated to one or more frequency bands such that each part signal is fed to a corresponding one of the plurality of line drivers, and wherein each of the plurality of line driver paths have a transfer function associated therewith, wherein an amount of a sum of the transfer functions of the plurality of line driver paths corresponds to an essentially non-frequency dependent constant value; and a signal combiner configured to combine output signals from the plurality of line drivers to form the transmission signal to be transmitted over the transmission path.

23. The device according to claim 22, wherein the distribution circuit comprises a plurality of filters, each of the plurality of filters having a pass band corresponding to a select one of the plurality of frequency bands, each of the plurality of filters coupled to receive the input signal and operably coupled to a corresponding one of the plurality of line drivers.

* * * * *